(12) United States Patent
Doshi et al.

(10) Patent No.: US 8,620,894 B2
(45) Date of Patent: Dec. 31, 2013

(54) SEARCHING FILES (75) Inventors: Apurva Ashwin Doshi, Seattle, WA (US); Juan-Lee Pang, Redmond, WA (US); Bohdan W. Raciborski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 12/973,949

(22) Filed: Dec. 21, 2010

(65) Prior Publication Data
US 2012/0158689 A1 Jun. 21, 2012

(51) Int. Cl.
G06F 7/00 (2006.01)
G06F 17/30 (2006.01)

(52) U.S. Cl.
USPC ............ 707/706; 707/705; 707/822; 707/828

(58) Field of Classification Search
USPC ................... 707/705, 706, 822, 828
See application file for complete search history.

(56) References Cited

U.S. PATENT DOCUMENTS

| | | | |
|---|---|---|---|
| 6,189,016 B1 | 2/2001 | Cabrera | |
| 6,397,308 B1 | 5/2002 | Ofek | |
| 6,629,110 B2 | 9/2003 | Cane | |
| 6,662,198 B2 | 12/2003 | Satyanarayanan | |
| 7,441,092 B2 | 10/2008 | Lyon | |
| 7,506,117 B2 | 3/2009 | Yamamoto | |
| 7,613,750 B2 | 11/2009 | Valiyaparambil | |
| 7,660,807 B2 | 2/2010 | Prahlad | |
| 8,296,398 B2 * | 10/2012 | Lacapra et al. | 709/219 |
| 8,332,907 B2 * | 12/2012 | Canning et al. | 726/1 |
| 8,346,731 B1 * | 1/2013 | Tsaur et al. | 707/673 |
| 8,375,008 B1 * | 2/2013 | Gomes | 707/694 |
| 8,417,746 B1 * | 4/2013 | Gillett et al. | 707/829 |
| 2002/0073137 A1 | 6/2002 | Meadway et al. | |
| 2004/0093323 A1 * | 5/2004 | Bluhm et al. | 707/3 |
| 2005/0015466 A1 * | 1/2005 | Tripp | 709/219 |
| 2005/0050054 A1 * | 3/2005 | Clark et al. | 707/100 |
| 2005/0187891 A1 * | 8/2005 | Johnson et al. | 707/1 |
| 2006/0053182 A1 * | 3/2006 | Sen et al. | 707/204 |
| 2006/0053347 A1 * | 3/2006 | van Ingen et al. | 714/47 |
| 2006/0116985 A1 | 6/2006 | Thind | |
| 2006/0117048 A1 | 6/2006 | Thind | |

(Continued)

FOREIGN PATENT DOCUMENTS

KR 10-2009-0063733 6/2009

OTHER PUBLICATIONS

Rebbapragada, Narasu, "First Look: Tiger Lives Up to the Hype", Retrieved at << http://www.pcworld.com/article/120646/first_look_tiger_lives_up_to_the_hype.html >>, Apr. 30, 2005, pp. 2.

(Continued)

Primary Examiner — Wilson Lee
Assistant Examiner — Jessica N Le
(74) Attorney, Agent, or Firm — L. Alan Collins; Collins & Collins Intellectual, LLC (57) ABSTRACT

Aspects of the subject matter described herein relate to searching files. In aspects, a search engine is able to search not only the current files but also is able to search for deleted and previous versions of files that satisfy queries. The search engine may maintain an index that facilitates searches. In addition, the search engine may also determine not only that a file satisfies a query but what version(s) of the file satisfies the query.

19 Claims, 6 Drawing Sheets

(56) References Cited

U.S. PATENT DOCUMENTS

| | | | |
|---|---|---|---|
| 2006/0117056 A1 | 6/2006 | Havewala | |
| 2006/0248039 A1* | 11/2006 | Brooks et al. | 707/1 |
| 2006/0248067 A1* | 11/2006 | Brooks et al. | 707/4 |
| 2007/0027935 A1 | 2/2007 | Haselton | |
| 2008/0243936 A1 | 10/2008 | Li | |
| 2009/0172273 A1 | 7/2009 | Piszczek | |
| 2009/0216798 A1* | 8/2009 | Wahlert et al. | 707/103 R |
| 2009/0292677 A1 | 11/2009 | Kim | |
| 2010/0070515 A1 | 3/2010 | Dutton | |
| 2010/0106691 A1 | 4/2010 | Preslan | |
| 2010/0161617 A1 | 6/2010 | Cao et al. | |
| 2010/0169591 A1 | 7/2010 | Atluri | |
| 2011/0016095 A1* | 1/2011 | Anglin et al. | 707/692 |
| 2011/0066805 A1* | 3/2011 | Janschitz et al. | 711/115 |
| 2012/0143825 A1 | 6/2012 | Boehm | |
| 2013/0018928 A1* | 1/2013 | Lacapra et al. | 707/822 |
| 2013/0066929 A1* | 3/2013 | Sedlar et al. | 707/822 |

OTHER PUBLICATIONS

"Windows Search Overview", Retrieved at << http://msdn.microsoft.com/en-us/library/aa965362%028VS.85%29.aspx >>, Retrieved Date: Sep. 22, 2010, pp. 5.

Jones, Tim M., "Build a Web spider on Linux", Retrieved at << http://www.ibm.com/developerworks/linux/library/l-spider/ >>, Nov. 14, 2006, pp. 14.

"Copernic Desktop Search Has a New Improved Index", Retrieved at << http://blog.copernic.com/index.php/tag/copernic-desktop-search/ >>, Jul. 29, 2010, pp. 6.

"Google desktop search", Retrieved at << http://www.pandia.com/resources/desktop.html >>, Retrieved Date: Sep. 22, 2010, pp. 6.

"Base of a Differential Backup", Microsoft TechNet, Retrieved Aug. 17, 2010.

Cooperstein, "Keeping an Eye on Your NTFS Drives: the Windows 2000 Change Journal Explained", Microsoft Systems Journal, Sep. 1999.

PCT International Search Report and Written Opinion for Application No. PCT/US2011/063195, Jul. 24, 2012.

* cited by examiner

SEARCHING FILES

BACKGROUND

Computers may be used to store a wealth of information. This information may be included, for example, in documents, spreadsheets, images, databases, e-mails, other content, and the like. Some users use a hierarchical folder/file system to organize their data on a storage device so that they can better find the data later. Other users place much of their data in relatively few directories. In either case, as time passes, the difficulty of remembering where data was stored increases.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to searching files. In aspects, a search engine is able to search not only the current files but also is able to search for deleted and previous versions of files that satisfy queries. The search engine may maintain an index that facilitates searches. In addition, the search engine may also determine not only that a file satisfies a query but what version(s) of the file satisfies the query.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth are used. The use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
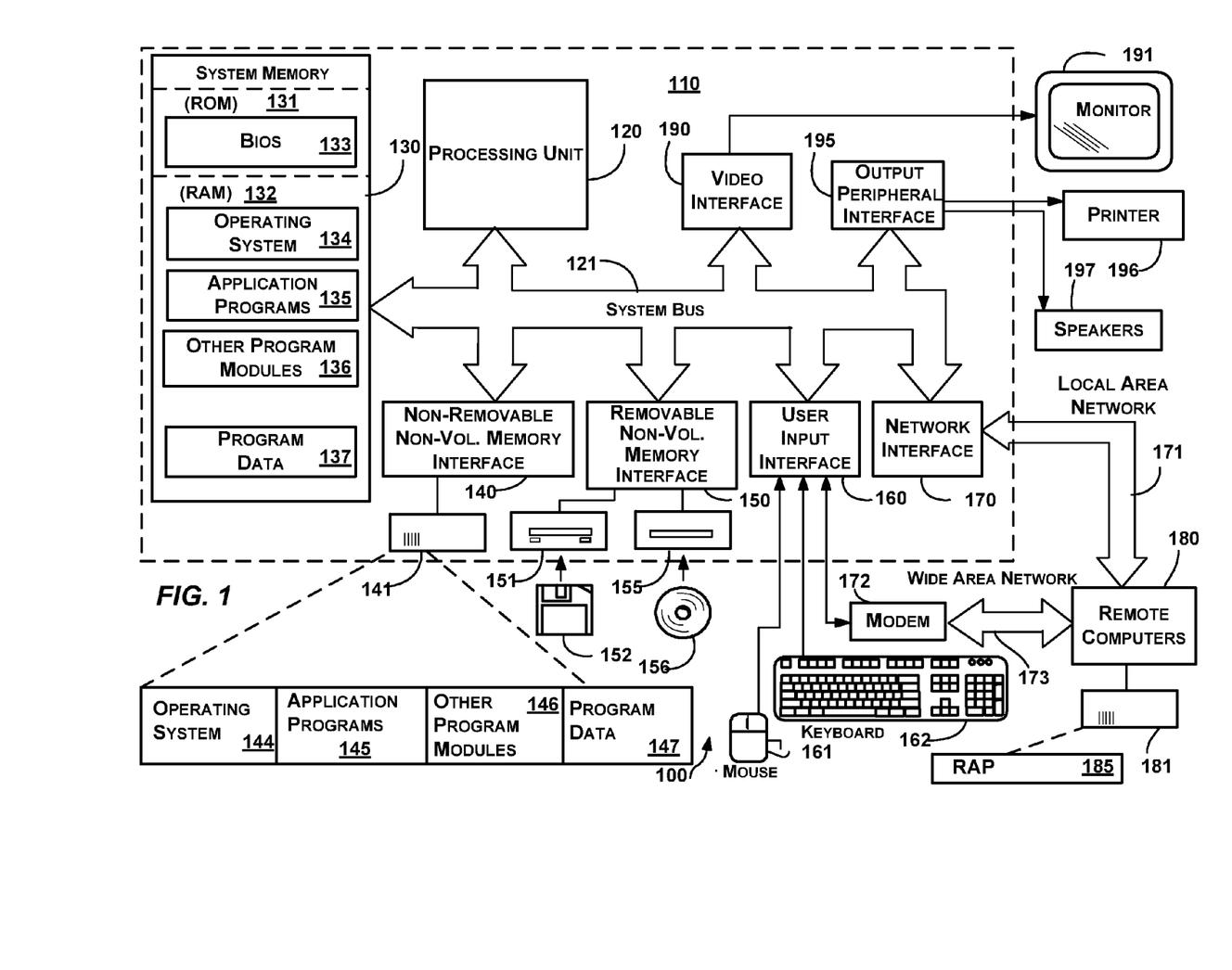
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Finding Data

Figure 2:
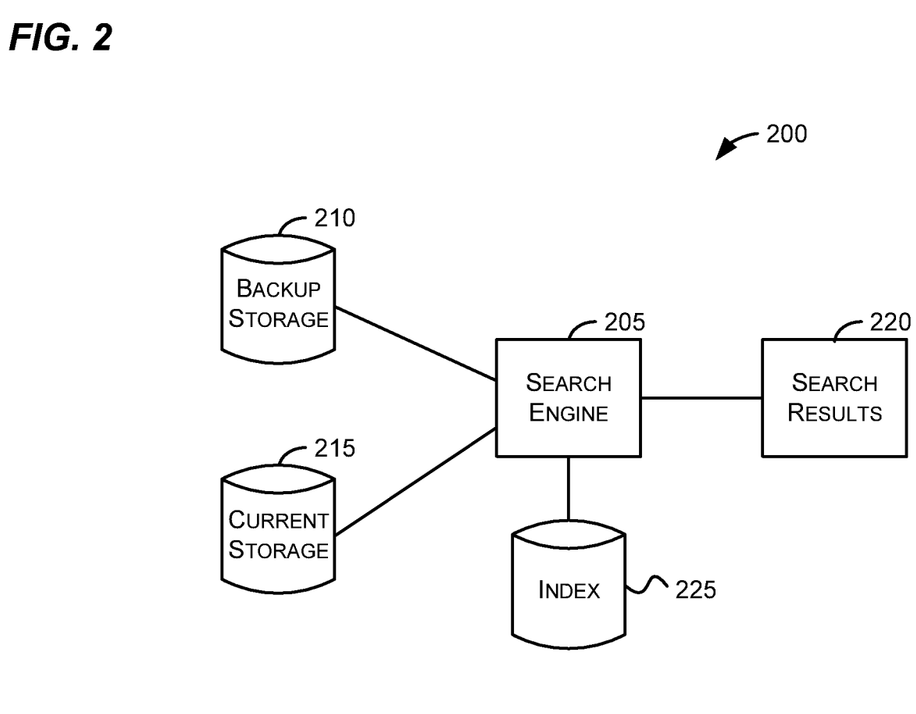
FIG. 2 is a block diagram that generally represents a system in accordance with aspects of the subject matter described herein.

As mentioned previously, remembering where data was stored becomes more difficult with time. FIG. 2 is a block diagram that generally represents a system in accordance with aspects of the subject matter described herein. As illustrated, the system 200 includes a search engine 205, backup storage 210, current storage 215, and may also include other components (not shown). Logically, the search engine 205 searches the files stored in the backup storage 210 and the current storage 215 to generate the search results 220.

The search engine 205 may be hosted on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the search engine 205 comprises the computer 110 of FIG. 1.

The backup storage 210 and the current storage 215 (hereinafter sometimes collectively referred to as the file storage) may include any storage media capable of storing data. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like. The file storage may be implemented using the computer storage media described in conjunction with FIG. 1.

The file storage may be internal, external, or include components that are both internal and external to an apparatus hosting the search engine 205.

The file storage may include one or more physical devices that are of the same or different types. An apparatus such as a computer hosting the search engine 205 may rely on the current storage 215 as the default storage to store file system objects such as files and directories or other data (hereinafter sometimes referred to as files). Files from the current storage 215 may be backed up onto the backup storage 210.

The current storage 215 may include files that are currently being used by a computer, for example. When a file is added, the current storage 215 may include the added file. When a file is deleted, the file may be removed from the current storage 215.

The backup storage 210, on the other hand, may include previous versions of files that are currently contained on the current storage 215 as well as versions of files that have been deleted from the current storage 215.

In responding to a query, the search engine 205 may logically search the files of the current storage 215 as well as the files of the backup storage 210. The term "logically" is used as there may be many ways to search the contents of the backup storage 210 and the current storage 215. For example, in one embodiment, the search engine 205 may search each file of the current storage 215 as well as each file of the backup storage 210 in response to a query. If a file satisfies the conditions of the query, an indicator of the file (e.g., the file name and potentially version) may be included in the search results 220.

As another example, the search engine 205 may search the backup storage 210 and the current storage 215 by searching the index 225. The index 225 may include a set of keywords that are mapped to one or more files in the current storage 215 and the backup storage 210. When a file is updated in the current storage 215, the old indexing to the file may be deleted from the index 225 and the new contents of the file may be indexed and placed in the index 225.

When a file is deleted, copies of previous versions of the file may be maintained on the backup storage 210. In one embodiment, only the latest version of the deleted file in the backup storage 210 is indexed into the index 225. In another embodiment, each deleted version of a deleted file is indexed into the index 225. For example, if a file is deleted, re-created, and deleted again, both deleted versions may be indexed into the index 225. In this example, when the search engine 205 receives a query, the search engine may search all files that currently exist on the current storage 215 as well the latest version of files that have been deleted from the current storage 215 by searching the index 225.

Figure 3:
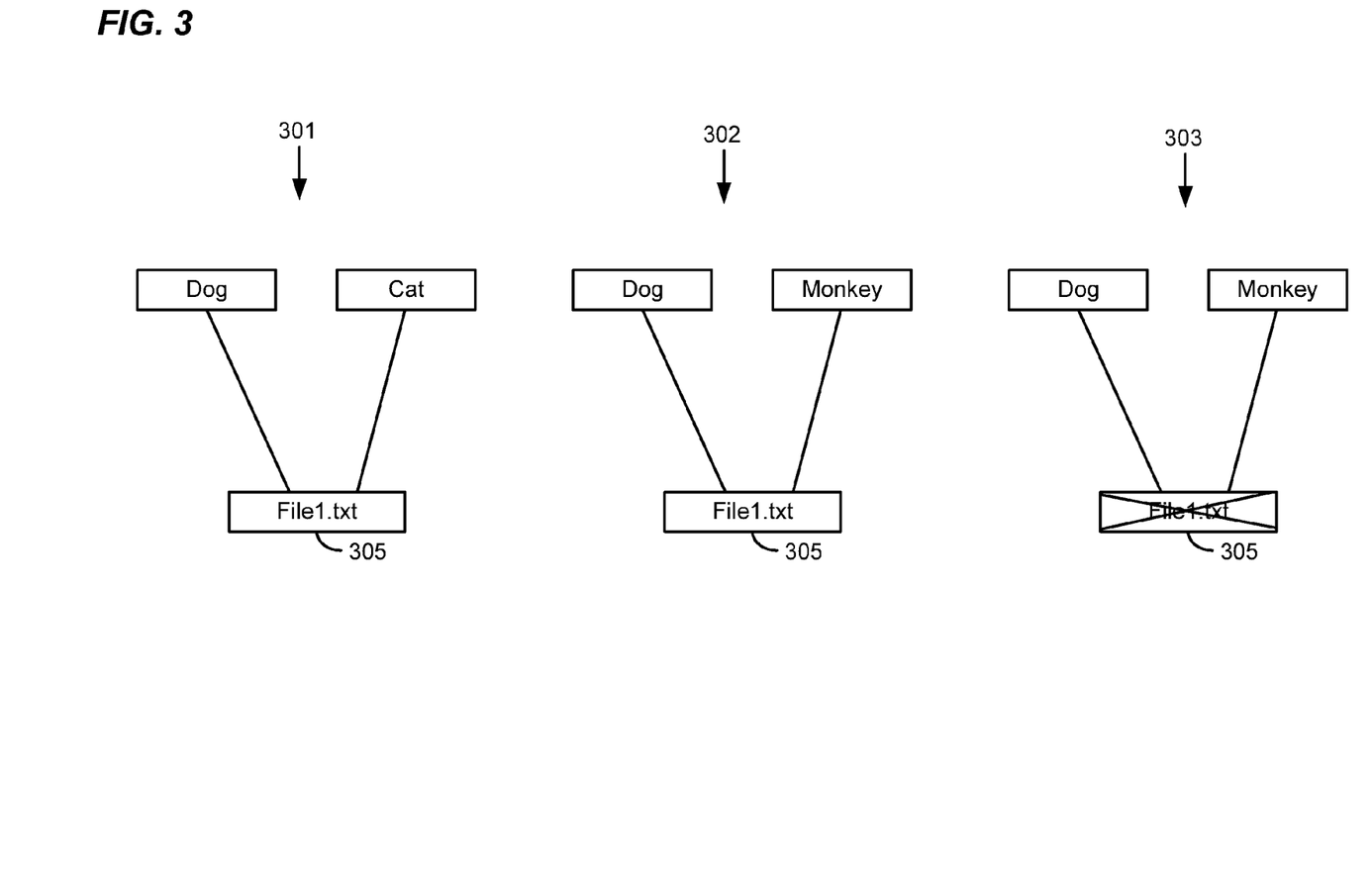
FIG. 3 is a block diagram that illustrates a portion of an exemplary index in which some versions of files may be missed in a search in accordance with aspects of the subject matter described herein.

Searching in this manner may yield less than all versions of files that would have satisfied the query (as described in more detail in conjunction with FIG. 3). For example, if a user deletes a word from a file and saves the file, and if the deleted word is needed to satisfy the query, the query will not return the file even though a previous version of the file would have satisfied the query.

The phrase "satisfy the query" or the like is sometimes used herein. Satisfying the query means satisfying the conditions of the query. For example, a query may include a list of conditions. For example, a user may want to have a listing of all files with the name that includes "Resume". In this case, the user may issue a query that includes a condition that the name of the file includes "Resume". This query is satisfied by all versions of files that include the name "Resume" in their name.

FIG. 3 is a block diagram that illustrates a portion of an exemplary index in which some versions of files may be missed in a search in accordance with aspects of the subject matter described herein. Turning to FIG. 3, at time 301, the file 305 includes the words dog and cat. An index may have the tokens dog and cat that reference the file 305. At time 302, the file 305 includes the words dog and monkey. At this time, an index may have the tokens dog and monkey that reference the file 305. At time 303 the file 305 is deleted. At this time, the index may still include the tokens dog and monkey (which may refer to a deleted version of the file 305). Using the technique above, a search for files that include the word cat would not yield the file 305 at time 303, even though cat was included in the file 305 at time 301.

In some implementations, the above behavior may be acceptable—particularly for a first pass in searching for files. In other implementations, a more exhaustive search of older and deleted versions may be needed.

Figure 4:
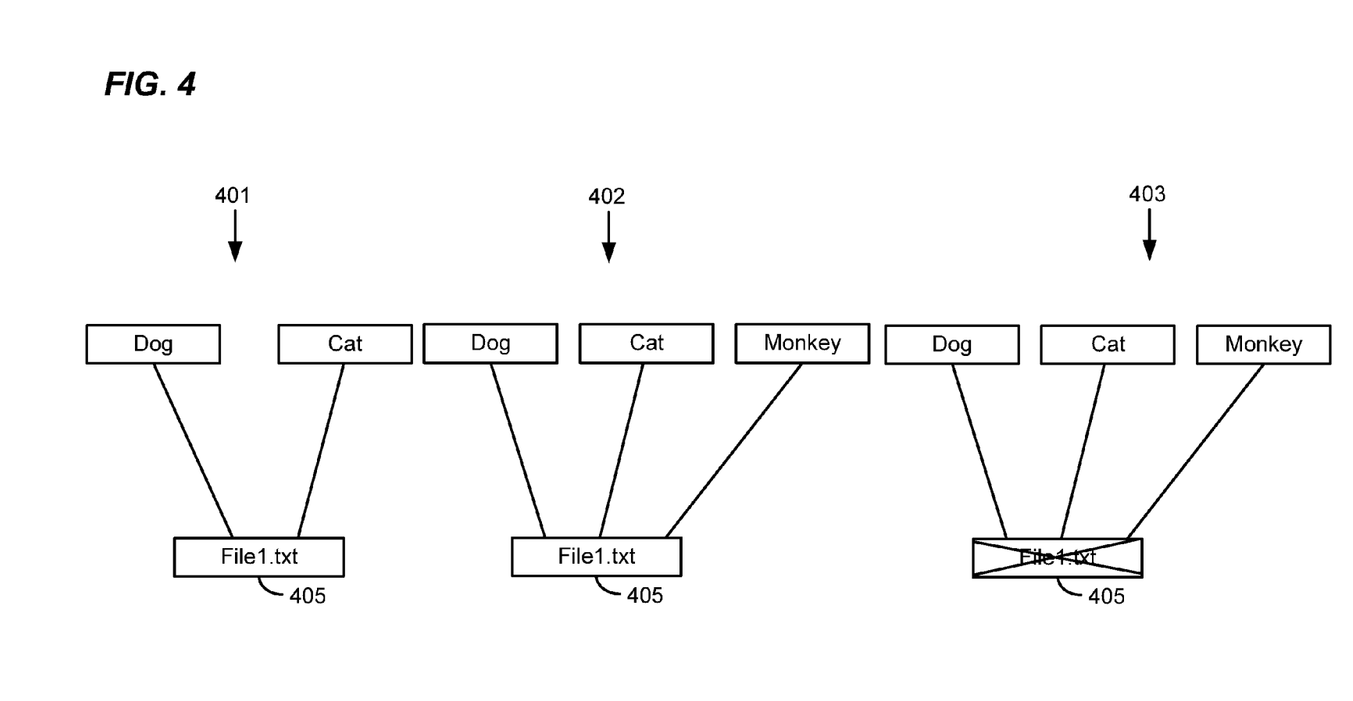
FIG. 4 is a block diagram that illustrates a portion of an exemplary index that may be used for a more exhaustive search in accordance with aspects of the subject matter described herein.

FIG. 4 is a block diagram that illustrates a portion of an exemplary index that may be used for a more exhaustive search in accordance with aspects of the subject matter described herein. In this example, when a file 405 is modified at time 402, instead of deleting the previous references from the index to the file, all references for any old tokens (e.g., cat) for the file are kept and tokens for any new words found in the file (e.g., monkey) are added to the index. When a file is deleted at time 403, the references from all the previous tokens in the index to the file are maintained. This allows a search for keywords were ever contained in the file.

The block referenced by numeral 405 may comprise an object that represents versions of the file. This object may comprise a data structure that includes, for example, an identifier of the file such as a name that can be used to find versions of the file using a catalog as described in more detail below.

Turning to FIG. 2, to accomplish this more exhaustive search capability, in one implementation, when a file is first backed up to the backup storage 210, the file is indexed and added to an index data structure. When another version of the file is backed up to the backup storage 210, all old indexes for the file are maintained in the index 225 while any new tokens and references for new words contained in the file are added to the index 225.

When the file is deleted, in one implementation, before deleting the file from the current storage 215, the file as it existed just prior to being deleted is copied to the backup storage 210 and indexing proceeds as described above as if the file had changed. This indexing captures any new tokens that may have been added to the file after the last version stored on the backup storage but before the file was deleted. Thereafter, the file may be deleted from the current storage 215. This implementation may be used to search for all keywords that existed in any backed up version of the file up to its deletion time.

In another implementation, when a file is deleted, the file is not copied to the backup storage 210 prior to deletion, but the references from tokens to the last version of the file in the backup storage 210 are maintained and not deleted. This implementation may lose search capability for changes that occurred between the last version backed up on the backup storage 210 and the version that existed on the current storage 215 just prior to deletion.

The more exhaustive search mechanism above may indicate that at least one version of a file satisfies a search query without indicating which particular version(s) satisfy the search query. For example, when tokens are added to an index for changes made to a file, the tokens may reference an object that represents the versions of the file. For example, this object may include a data structure that includes an identifier such as a name that identifies the file but that does not directly identify a particular version of the file. To determine the particular version(s) that satisfy the search query, the current version of the file may be searched in the current storage 215 and the previous versions of the file may be searched in the backup storage 210. Specific versions of the file that satisfy the query may then be located and returned.

One exemplary mechanism that may be used to catalog versions of a file and obtain the versions based on the name of the file is disclosed in a United States patent application entitled "FILE SYSTEM BACKUP USING CHANGE JOURNAL," filed Dec. 3, 2010, having Ser. No. 12/959,401, which application is assigned to the assignee of this patent application and hereby incorporated by reference. Based on the teachings herein, those skilled in the art may recognize other mechanisms for implementing this capability that may be utilized without departing from the spirit or scope of aspects of the subject matter described herein.

In one embodiment, the search engine 205 may update the index 225 upon an event including: 1) A file in the current storage 215 is changed; or 2) A file is copied to the backup storage. In the first case, the tokens that refer to no other files and the in the index that reference the file that has changed in the current storage 215 may be deleted and new tokens and references may be created based on the new contents of the file. In the second case, all old tokens and references may be kept and one or more elements may be added for content that is new since the last version of the file. In this implementation, the search engine 205 may use just the index 225 to find files (or objects that represent multiple versions of files) to satisfy a query. Once a file has been found, additional information such as the catalog disclosed in the above-mentioned United States patent application may be consulted to determine what versions of the file satisfy the query.

A data protection engine (not shown) that creates backup versions of files on the backup storage 210 may be configured to copy only protected files from the current storage 215. Protected files may be designated individually and/or as files that are descendants of directories that are designated as protected. For example, the file c:\mydata.txt may be individually designated as protected and the directory c:\mydata may be designated as protected. In the latter case, all files that exist in c:\mydata or any of its subdirectories or their subdirectories may be protected.

In this case, the current storage 215 stores current versions of files, the backup storage 210 stores previous versions of protected files of the current storage 215 as well as versions of protected files that have been deleted from the current storage 215.

Furthermore, how the search engine 205 updates the index 225 based on a changed file may be determined by whether the changed file is a protected file or a non-protected file. For example, in response to an indication that a non-protected file has changed, the search engine 205 may perform actions, including:

1. Deleting from the index 225 prior references to the non-protected file. These prior references exist prior to when the non-protected file was changed;

2. Deleting from the index 225 prior tokens that only reference the non-protected file. In other words, if a token only references the non-protected file that was changed, the token may be deleted;

3. Adding to the index 225 new tokens for each token found in the non-protected file after the non-protected file was changed; and 4. Adding to the index 225 references from tokens of the index to the non-protected file where corresponding tokens exist in the non-protected file after the non-protected file was changed. For example, for each token found in a file, a corresponding token in the index 225 is updated to reference the file.

If the file is a protected file that is being copied the backup storage, the search engine 205 may perform actions, including:

1. Maintaining any references from tokens in the index to an object that represents versions of the file. In other words, references to the file are not deleted as previously described in conjunction with FIG. 4;

2. Adding new tokens to the index 225 for each token found in the new version of the file. For example, if the file includes tokens that are not currently found in the index 225, these tokens may be added to the index 225; and 3. Adding to the index 225 references from the new tokens to the object that represents versions of the file. For example, this refers to adding additional references to the file for each new token found in the file.

When a protected file is deleted from the current storage, the search engine 205 may maintain the index such that any references from tokens in the index to an object that represents the deleted file are kept.

Searches may be performed in multiple stages. In a first stage, the search engine 205 may search the current storage to find current versions that satisfy a query and search the backup storage to find deleted files that satisfy the query. Afterwards, if a more exhaustive search is desired, the search engine 205 may conduct a search that includes previous versions of protected files (e.g., by creating and searching an index that includes all tokens of the protected files).

Figure 5:
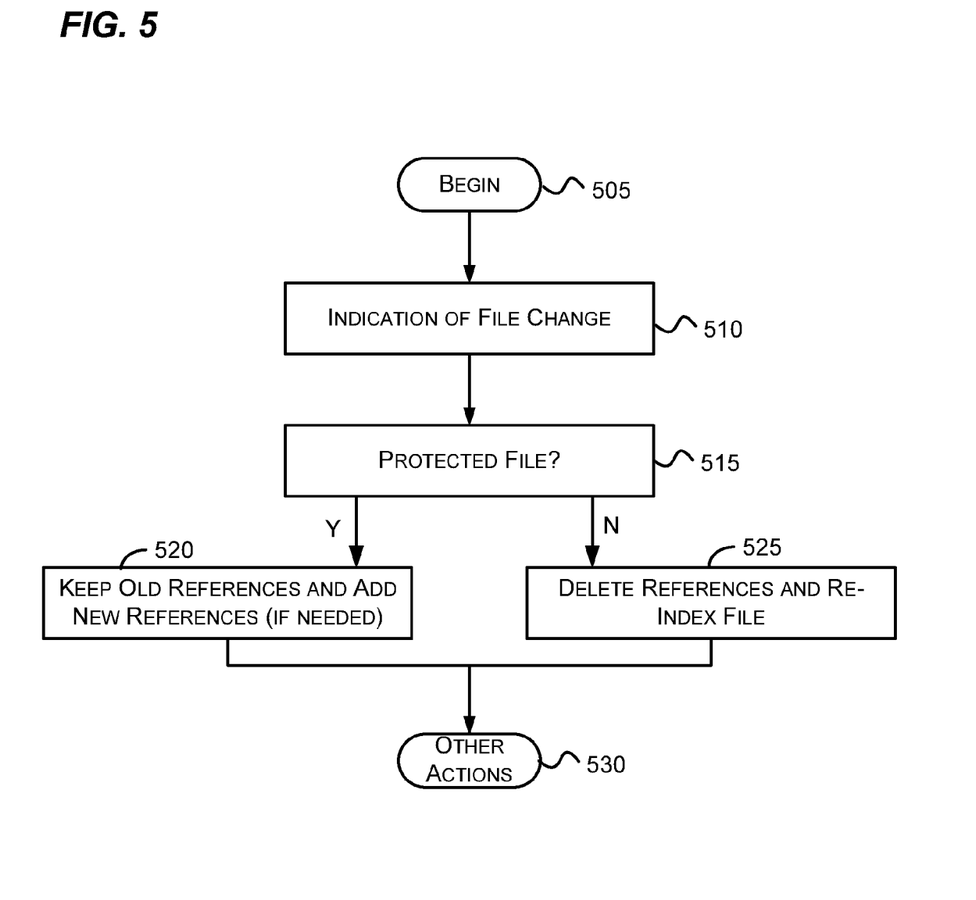
FIG. 5 is a flow diagram that generally represents exemplary actions that may occur in updating an index in accordance with aspects of the subject matter described herein.
Figure 6:
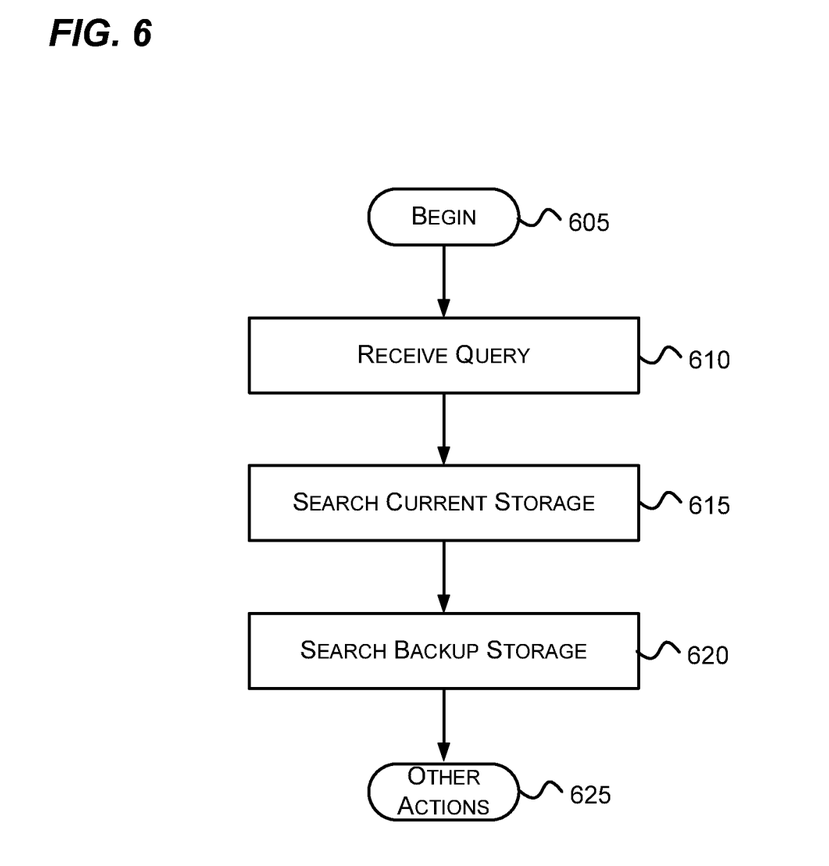
FIG. 6 is a flow diagram that generally represents exemplary actions that may occur in responding to a query in accordance with aspects of the subject matter described herein.

FIGS. 5-6 are flow diagrams that generally represent exemplary actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents exemplary actions that may occur in updating an index in accordance with aspects of the subject matter described herein. Turning to FIG. 5, at block 505, the actions begin. At block 510, an indication that a file has changed is received. For example, referring to FIG. 2, the search engine 205 may receive an indication that a file has changed on the current storage 215. This indication may be received, for example, from a component that watches for file changes, by scanning a directory to see if the file has changed based on attributes or contents, or the like.

At block 515, a determination is made as to whether the file is in a protected namespace. A protected namespace may, for example, include a path (e.g., c:\mydata) that indicates that any files that are descendants of the path are to be backed up to backup storage. For example, referring to FIG. 2, the search engine may consult a data structure (not shown) to check whether the file is in a protected namespace.

If the file is in a protected namespace, the actions continue at block 520; otherwise, the actions continue at block 525.

At block 520, new references are added to the index for new tokens included in the file. In addition, previous references to the file are kept in the index. This allows a search to determine whether older versions of a file satisfy a query. One exemplary way of keeping previous references to the file includes overwriting each previous reference from a token in the index to the file if the file, before and after being changed includes the token. For example, referring to FIG. 2, the search engine 205 may add, to the index 225, new references to a protected file for new tokens included in the new file.

At block 525, references (if any) to the file are deleted and the file is re-indexed to add references to the file in the index. For example, referring to FIG. 2, the search engine 205 may delete old references to a non-protected file and add new references to the file to account for changes to the file. One exemplary way of re-indexing a non-protected file to add references to the file in the index includes adding any new tokens included in the file that are not already in the index to the index and adding references from tokens included in the index where the tokens are also included in the file.

At block 530, other actions, if any, may be performed. For example, if an indication that the file has been deleted is received, a search engine may maintain (or re-index) in the index any existing references from tokens to an object that represents one or more versions of the file that exist in the backup storage.

As another example, a query may be received at a search engine. In response, the search engine may search the index 225 to find a set of files that satisfy the query. The set may include one or more files from current storage and/or backup storage.

In addition, if a backup file on the backup storage satisfies a query, the search engine may further search versions of the backup file to find at least one version that satisfies the query. Afterwards, the search engine may provide an indication (e.g., a data structure such as a collection) of the at least one version that satisfies the query.

FIG. 6 is a flow diagram that generally represents exemplary actions that may occur in responding to a query in accordance with aspects of the subject matter described herein. As mentioned previously, the actions described in conjunction with the blocks may occur in parallel or at the same time. For example, searching the current storage may occur in parallel or at the same time as searching the backup storage if, for example, the search is done via an index.

Turning to FIG. 6, at block 605, the actions begin. At block 610, a request to search for files that satisfy a query is received. For example, referring to FIG. 2, the search engine 205 may receive a request to satisfy a query.

At block 615, the current storage is searched for current files that satisfy the query. For example, referring to FIG. 2, the search engine 205 may search the current storage 215 to find current files that satisfy the query.

At block 620, the backup storage is searched for deleted files that have been deleted from the current storage that also satisfy the query. For example, referring to FIG. 2, the search engine may search the backup storage 210 to find files that satisfy the query.

At block 625, other actions, if any, may be performed. For example, a search engine may receive an indication that a non-protected file has changed on the current storage and may, in response, re-index the file. As mentioned previously, this re-indexing may include:

1. Adding, to the index, any new tokens included in the file that are not already in the index, and 2. Adding references from tokens in the index to the file where the tokens are also included in the file As another example, the search engine may also search the backup storage for versions of files that satisfy the query to identify the specific versions that satisfy the query. Searching the backup storage may include searching an index that, for each token found in any version of a file, includes a single reference to an object that represents the versions of the file.

As another example of other actions, an indication may be received that a file has been or is to be copied to the backup storage. In response, the search engine may update an index to reference the file for each new token included in the file while maintaining all previous references to the file in the index.

As can be seen from the foregoing detailed description, aspects have been described related to searching. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed on a computing device, the method comprising:
   obtaining an indication that a file has changed;
   checking whether the changed file is in a protected namespace, where files in the protected namespace are designated for back up to backup storage;
   if the changed file is in the protected namespace, then:
      maintaining, in an index, references to an object that represents versions of the changed file,
      adding to the index a new token for each new token found in the changed file,
      adding, to the index, references to the changed file for each new token found in the changed file; and
   if the changed file is not in a protected namespace, then:
      deleting, from the index, prior references to the changed file, where the prior references existed prior to when the changed file was changed
      deleting, from the index, prior tokens that reference only the changed file, where the prior tokens existed prior to when the changed file was changed,
      adding, to the index for any token found in the changed file, a new token, and
      updating, in response to each token in the index that corresponds to a token in the changed file, the each token to reference the changed file.

2. The method of claim 1, where the obtaining comprises receiving the indication that the file has been or is to be copied to the backup storage, and where the maintaining comprises overwriting a previous reference from a token in the index to the file if the file, before and after being changed, includes the token.

3. The method of claim 1, further comprising searching the backup storage and current storage, where the searching comprises searching the index.

4. The method of claim 1, further comprising receiving a query and, in response, searching the index and finding a set of files that satisfy the query, where the set of the files include one or more files from current storage and/or backup storage.

5. The method of claim 4, further comprising, for a backup file included in the backup storage, searching versions of the backup file to find at least one version that satisfies the query and providing an indication of the at least one version that satisfies the query.

6. The method of claim 1, where files that have been deleted are still indexed in the index.

7. At least one computer storage device storing computer-executable instructions that, when executed by a computing device, cause the computing device to perform actions comprising:
   obtaining an indication that a file has changed;
   checking whether the changed file is in a protected namespace, where files in the protected namespace are designated for back up to backup storage;
   if the changed file is in the protected namespace, then:
      maintaining, in an index, references to an object that represents versions of the changed file,
      adding, to the index, a new token for each new token found in the changed file,
      adding, to the index, references to the changed file for each new token found in the changed file; and
   if the changed file is not in a protected namespace, then:
      deleting, from the index, prior references to the changed file, where the prior references existed prior to when the changed file was changed,
      deleting, from the index, prior tokens that reference only the changed file, where the prior tokens existed prior to when the changed file was changed,
      adding, to the index, for any token found in the changed file, a new token, and
      updating, in response to each token in the index that corresponds to a token in the changed file, the each token to reference the changed file.

8. The at least one computer storage device of claim 7, where the obtaining comprises receiving the indication that the file has been or is to be copied to the backup storage, and where the maintaining comprises overwriting a previous reference from a token in the index to the file if the file, before and after being changed, includes the token.

9. The at least one computer storage device of claim 7, the actions further comprising searching the backup storage and current storage, where the searching comprises searching the index.

10. The at least one computer storage device of claim 7, where copies of previous version of the changed file are maintained in the backup storage.

11. The at least one computer storage device of claim 7, the actions further comprising further comprising receiving a query and, in response, searching the index and finding a set of files that satisfy the query, the set of the files include one or more files from current storage and/or backup storage.

12. The at least one computer storage device of claim 11, the actions further comprising, for a backup file included in the backup storage, searching versions of the backup file to find at least one version that satisfies the query and providing an indication of the at least one version that satisfies the query.

13. The at least one computer storage device of claim 7, the actions further comprising where files that have been deleted are still indexed in the index.

14. A computing device and at least one program module together configured for performing actions comprising:
   obtaining an indication that a file has changed;
   checking whether the changed file is in a protected namespace, where files in the protected namespace are designated for back up to backup storage;
   if the changed file is in the protected namespace, then:
      maintaining, in an index, references to an object that represents versions of the changed file,
      adding to the index a new token for each new token found in the changed file,
      adding, to the index, references to the changed file for each new token found in the changed file; and if the changed file is not in a protected namespace, then:

deleting, from the index, prior references to the changed file, where the prior references existed prior to when the changed file was changed, deleting, from the index, prior tokens that reference only the changed file, where the prior tokens existed prior to when the changed file was changed, adding, to the index, a new token for any token found in the changed file, and updating, in response to each token in the index that corresponds to a token in the changed file, the each token to reference the changed file.

15. The computing device and the at least one program module of claim 14, the actions further comprising searching the backup storage and current storage, where the searching comprises searching the index.

16. The computing device and the at least one program module of claim 14, where copies of previous version of the changed file are maintained in the backup storage.

17. The computing device and the at least one program module of claim 14, the actions further comprising receiving a query and, in response, searching the index and finding a set of files that satisfy the query, where the set of the files include one or more files from current storage and/or backup storage.

18. The computing device and the at least one program module of claim 17, the actions further comprising, for a backup file included in the backup storage, searching versions of the backup file to find at least one version that satisfies the query and providing an indication of the at least one version that satisfies the query.

19. The computing device and the at least one program module of claim 14, the actions further comprising where files that have been deleted are still indexed in the index.

* * * * *